(12) United States Patent
Apple et al.

(10) Patent No.: US 9,473,621 B1
(45) Date of Patent: Oct. 18, 2016

(54) SYSTEMS AND METHODS FOR CUSTOMER ADMINISTERED CALLING CONTROLS

(75) Inventors: Wesley Larry Apple, Elon, NC (US);
Dan Apple, legal representative, Elon, NC (US); Wasif Jalil Qureshi, Greensboro, NC (US); Johnnie Richard Tayloe, Rural Hall, NC (US); Charles David Orr, Burlington, NC (US)

(73) Assignee: CONFINEMENT TELEPHONY TECHNOLOGY, LLC, Greensboro, NC (US)

( * ) Notice: Subject to any disclaimer, the term of this patent is extended or adjusted under 35 U.S.C. 154(b) by 79 days.

(21) Appl. No.: 13/567,414

(22) Filed: Aug. 6, 2012

Related U.S. Application Data

(60) Provisional application No. 61/515,441, filed on Aug. 5, 2011.

(51) Int. Cl.
*H04M 7/00* (2006.01)
*H04M 3/38* (2006.01)
*H04L 29/06* (2006.01)

(52) U.S. Cl.
CPC .......... *H04M 3/385* (2013.01); *H04L 63/0861* (2013.01)

(58) Field of Classification Search
USPC ............... 379/201.01, 188, 88.16, 191, 249
See application file for complete search history.

(56) References Cited

U.S. PATENT DOCUMENTS

| | | | |
|---|---|---|---|
| 5,623,539 A * | 4/1997 | Bassenyemukasa et al. | 379/88.02 |
| 6,795,540 B1 * | 9/2004 | Mow | 379/188 |
| 7,805,457 B1 * | 9/2010 | Viola et al. | 707/769 |
| 7,860,222 B1 * | 12/2010 | Sidler et al. | 379/32.01 |
| 8,582,738 B1 * | 11/2013 | Keiser | 379/114.14 |
| 2003/0076940 A1 * | 4/2003 | Manto | 379/114.05 |
| 2004/0203675 A1 * | 10/2004 | Reindle et al. | 455/415 |
| 2005/0135586 A1 * | 6/2005 | Amick | 379/201.1 |
| 2005/0216953 A1 * | 9/2005 | Ellingson | 726/6 |
| 2007/0026852 A1 * | 2/2007 | Logan et al. | 455/422.1 |
| 2007/0041545 A1 * | 2/2007 | Gainsboro | 379/188 |
| 2009/0228383 A1 * | 9/2009 | Martinez et al. | 705/35 |
| 2010/0226261 A1 * | 9/2010 | Piche | 370/252 |
| 2012/0099714 A1 * | 4/2012 | Hodge | 379/88.16 |
| 2012/0176466 A1 * | 7/2012 | Wrench | 348/14.07 |
| 2013/0010943 A1 * | 1/2013 | Rokosky | 379/188 |
| 2013/0343206 A1 * | 12/2013 | Wilhoite et al. | 370/250 |
| 2014/0016646 A1 * | 1/2014 | Gallant et al. | 370/395.1 |
| 2014/0081869 A1 * | 3/2014 | Felger | 705/44 |
| 2015/0358457 A1 * | 12/2015 | Hodge | 379/88.02 |

* cited by examiner

*Primary Examiner* — William Deane, Jr.
(74) *Attorney, Agent, or Firm* — FisherBroyles, LLP; Eugene B. Joswick

(57) ABSTRACT

Methods and systems for customer administered calling controls in an institutional setting comprising receiving customer control information from a customer outside of an institution where the customer control information comprising one or more control mechanisms and providing a resident of the institution, through a telephone network, phone services subject to the one or more control mechanisms.

7 Claims, 7 Drawing Sheets

Profiles

| | | Profile Name | Description | Enabled |
|---|---|---|---|---|
| 📝 | ✗ | Parent 1 | Description 1 | [X] |
| 📝 | ✗ | Parent 2 | Description 2 | [X] |
| 📝 | ✗ | Child 1 | Description 3 | |
| 📝 | ✗ | Child 2 | Description 4 | [X] |

✚ Add

In the event you are unable to answer your primary phone when an inmate calls, please enter additional phone numbers you would like for us to automatically forward the call.

| | | Phone Number | Description | Enabled |
|---|---|---|---|---|
| 📝 | ✗ | (336) 111-2222 | Description 1 | [X] |
| 📝 | ✗ | (336) 123-4567 | Description 2 | [X] |

✚ Add

Figure 4

Profile Name: _____    Profile Enabled: [X]
Profile Description: _____

| Enabled | Feature | Start HH : MM : AM/PM | End HH : MM : AM/PM |
|---|---|---|---|
| [X] | Time Calls are Allowed: | 5 ⌄ 30 ⌄ PM ⌄ | 8 ⌄ 00 ⌄ PM ⌄ |
| [X] | Length of Call: | ☐ Max Time or 10 ⌄ Minutes | |
| [X] | Number of Calls per Day: | 10 ⌄ Calls | |
| [X] | Type of Calls: | [X] Collect  [X] Debit | |
| | | [X] Calling Card  [X] Free | |
| [X] | Daily Spend: | $ 0.00 | |
| [X] | Personal Id Number: | 1234 | |
| [X] | Shared Id Number: | 5678 | |
| [X] | Activity Notifications: | Method ⌄  Email or Phone Number | |

| | Facility Name | Description | Enabled |
|---|---|---|---|
| ✗ | Facility 1 ⌄ | Description 1 | [X] |
| ✗ | Facility 2 ⌄ | Description 2 | [X] |

✚ Add

| | Inmate ID | Description | Enabled |
|---|---|---|---|
| ✗ | Inmate ID | Description 1 | [X] |
| ✗ | Inmate ID | Description 2 | [X] |

✚ Add

Figure 5

SYSTEMS AND METHODS FOR CUSTOMER ADMINISTERED CALLING CONTROLS

RELATED APPLICATIONS

This application claims the benefit of U.S. Provisional Application No. 61/515,441 filed on Aug. 5, 2011, which is incorporated herein by reference.

FIELD OF THE INVENTION

The present subject matter relates to the administration and application of custom calling controls to be administered by customers and users of an institutional telecommunication system. More particularly, the present subject matter relates to the administration and application of custom calling controls for the purpose of enabling called parties to place self-imposed limitations on calling activity received from an institutional telecommunication system, optionally allowing such limitations as calling activity only by pre-authorized call recipients, preset limits for the volume or cost of calls over a given period of time, predetermined windows of time for allowing or disallowing calling activity, providing for notification alerts related to such calling activity, and providing for multiple calling profiles per called number, each such profile having its own distinct limitations and behaviors.

BACKGROUND OF THE INVENTION

In the context of the operation of telecommunication systems that serve a residential institution such as a correctional confinement facility, many problems are traditionally observed relating to the abuse and/or the inability to effectively manage calling activity by users of the telecommunication system. Traditionally, controls to guard against abuse or misuse have been imposed and administered by the residential institution or by the telecommunications provider, while the called, or non-resident, party is only able to control calling activity by way of blocking or unblocking their account, or by adding or removing funds in a crude attempt to manage call volume and costs. Taking into consideration that the majority of calling activity from residential institutions is funded by the called, non-resident party, it becomes particularly desirable that the called party also be able to participate in the management of such calling activity.

In one common example, called parties, or "customers," are frequently unaware of the exact amount of call charges they have incurred over a period of time, resulting, for example, in the sudden loss of service once the account's funds have been exhausted or in the receipt of an unexpectedly high telephone bill. Similarly, called parties frequently pay a given amount on a prepaid account with the expectation that it will last a specific period of time, only to have the funds be depleted long before the expected date, with the called party having no more financial resources available to further fund the account in the interim, thereby preventing contact with friends or loved ones. As an attempted countermeasure against this, customers can make small, frequent payments to their account so as not to exhaust all of their financial resources prematurely. This method, however, carries a significant disadvantage to the customer in that they incur additional processing fees each time a payment is made to the account. As a result of making a larger number of smaller payments, a higher percentage of each dollar spent is consumed by payment processing fees, and a smaller percentage is available for actual telecommunications services.

In another common example, customers frequently desire to place differing restrictions or limitations on specific members of the household when receiving incoming phone calls from a residential institution. For example, a mother with a son who is incarcerated may wish to place restrictions on the amount of time or money that can be spent conversing with certain members of the family, while she herself may wish to have no restrictions imposed upon her own activity. Further still, the mother may wish to completely prevent calling activity by anyone present in the household who is not authorized for such activity, regardless of whether or not they happen to answer an incoming call from the resident. Similarly, the mother may also wish to limit calling activity to the hours of the day when she herself is at home, and is able to monitor the calling activity in person. Furthermore, in some instances, the mother may also desire to receive some form of notification when calling activity has taken place by other members of the household who are authorized to receive calls on her account.

Yet another common example of the need for customer-administered calling controls can be found in the frequent desire by called parties to have an automatic attempt made to complete the call from the residential institution to a second or third number, such as a cell phone or a work telephone, in the event that the party is unavailable at the original called number. In this example, it may also be desirable to consolidate the call charges back to the original number called by the resident at the institution. Often, customers will attempt to obtain this level of functionality through the use of call-forwarding features from the original number to the number at which they expect to be available. This method, however, has its own disadvantages. First, the customer must be diligent in constantly enabling, disabling, and re-directing call-forwarding features. Frequently, calls are missed due to errant call-forwarding settings. The second disadvantage brought about by this method is that when call-forwarding features outside of the residential telecommunications system are utilized, the management of the residential institution, as well as the telecommunications provider, lose visibility as to exactly which terminal number actually received the call. This is particularly troublesome in the case of correctional confinement facilities, where telephone activity is highly controlled and often investigated for evidence of criminal activity.

Still another common example of the need for customer-administered calling controls can be found in the frequent desire by the calling party, or resident user, to speak only with a specific person at the called number. In this case, for instance, an incarcerated man may wish, at a particular moment, to speak only with his wife, but not with her mother who may also be in the same household and, in fact, may also be an authorized user of the telephone account.

Yet another example of the need for customer-administered calling controls arises from the creation of Parent/Child accounts allowing a group of phone numbers to be associated to a master account of which funds are shared. Multiple challenges and problems occur in this context. For example, if a daughter is linked to a parent's account and she decides to put money directly on her account is this money shared on the account or only available to the daughter? If only available to the daughter but the account has shared funds available which funds are consumed first? If shared on the whole account and the daughter wants a refund how are her funds refunded?

SUMMARY OF THE INVENTION

The limitations of the prior art are overcome and a technical advance is made in accordance with the present subject matter, detailed embodiments of which are presented in the following detailed description.

In some embodiments, an automated software system introduces a number of novel features, techniques, and methods into the telecommunications system and makes use of various processes, some of which are operated independently, and some of which advantageously integrate with existing systems in order to obtain maximum efficiency, transparency, and accountability.

In some embodiments, a Customer Profile Interface process is provided to enable customers to manage control features that are applied to calls placed to a particular called number associated with the account.

In some embodiments, a Call Control process is provided. The Call Control process accesses information relative to Called Party Profiles associated with the requested destination telephone number when a call is placed by a resident.

In some embodiments, a Called Number Validation process is provided. The Called Number Validation process responds to requests from the Call Control process for relevant Called Party Profile data, assimilates the data, and transmits the data in a particular format to the Call Control process.

In some embodiments, a Notification process is provided. The Notification process responds to signals from the Call Control process indicating that a notification is needed to a particular customer.

In some embodiments, a Reporting process is provided. The Reporting process responds to requests from multiple interfaces and systems, including, but not limited to, residential administrative staff interfaces, telecommunications provider interfaces, and the Customer Profile interface process.

BRIEF DESCRIPTION OF THE DRAWINGS

These and other advantages of illustrative embodiments of the present subject matter will be apparent to those skilled in the art by reference to the following detailed description and the accompanying drawing figures, in which:

FIG. 4 is a screenshot illustrating customer-administered call control options according to certain embodiments.

FIG. 5 is a screenshot illustrating customer-administered call control options according to certain embodiments.

DETAILED DESCRIPTION

Detailed embodiments are disclosed herein. However, it is to be understood that the disclosed embodiments are merely exemplary and that different embodiments are possible. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present disclosure.

In accordance with one aspect of illustrative embodiments of the present subject matter, customer-administered calling controls are accomplished in a residential institution telecommunications context by an automated computer software system that is integrated at multiple levels with the operation and provision of the telecommunication and billing services, and with other particular components and databases contained within the institutional management software systems.

An automated software system providing one or more of the features disclosed herein may be included in or added to a telecommunications system in various ways, and may make use of various modules, some of which are operated independently, and some of which advantageously integrate with existing systems in order to obtain maximum efficiency, transparency and accountability. Components or modules providing one or more of the features disclosed herein may be provided via one or more computers or other electronic devices located at an institutional facility, at centralized and/or remote telephone network or computer network locations, located at any other location, or located at any combination of such locations.

Figure 1:
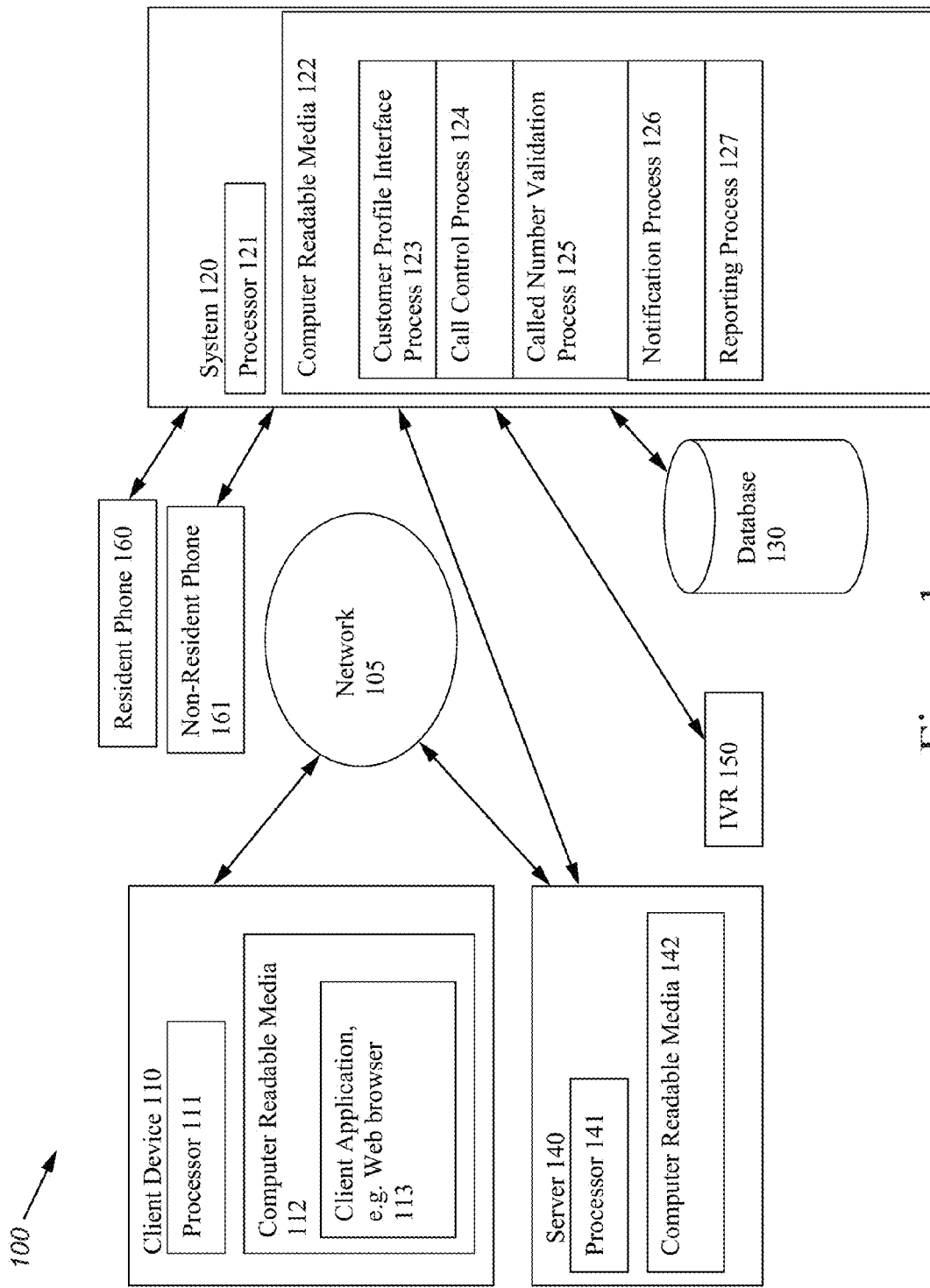
FIG. 1 illustrates an exemplary system in certain embodiments.

An exemplary embodiment provides messaging processes in an institutional setting. FIG. 1 illustrates an exemplary system 100 comprising a messaging service device 120, which could be operated by a telecommunications service provider ("TSP"), with a processor 121 and computer readable media and storage capabilities 122. Stored within this main system are appropriate hardware, firmware, and/or software for implementing a customer profile interface process 123, call control process 124, called number validation process 125, notification process 126, and reporting process 127. Coupled to the messaging service device 120 is a database 130 comprising called party profiles and other records. Also coupled to the messaging service device 120 is a server 140 comprising a processor 141 and computer readable media and storage capabilities 142. Server 140 is accessible by a client device 110 across a suitable network 105, for example a local area network or the Internet. Such access could be wired or wireless, as is well known to one of ordinary skill in the art. Client device 110 comprises a processor 111 as well as computer readable media and storage capabilities 112 with client applications such as a web browser 113. Messaging service device 120 may also provide for interactive voice recognition ("IVR") functionality 150. Messaging service device 120 is also coupled to a one or more phones 160 accessible to residents of the institution. Similarly one or more non-resident phones 161 may also be coupled to the main system 120. Such coupling is via any suitable telephone network, as would be understood by one of ordinary skill in the art. Institution residents may also optionally access messaging service device 120 through a wireless device (not shown) or through a kiosk (not shown) as would be understood by one of ordinary skill in the art.

Applications and other electronic content execute or are otherwise used on the exemplary computer devices 110, 120, and 140 and are shown as functional components or modules. As is known to one of skill in the art, such applications and content may be resident in any suitable computer-readable medium and execute on any suitable processor. For example, as shown the client device 120 comprises a computer-readable medium 122 such as a random access memory ("RAM") coupled to a processor 121 that executes computer-executable program instructions and/or accesses information stored in memory (not shown). Such a processor 121 may comprise a microprocessor, an ASIC, a state machine, or other processor, and can be any of a number of computer processors. Such a processor can comprise or may be in communication with a computer-readable medium that stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The client device 110 may also comprise a number of external or internal devices such as a mouse, a CD-ROM, DVD, a keyboard, a display, audio speakers, one or more microphones, or any other input or output devices. Device 110 could be a personal computing device, a mobile device, or any other type of electronic devices appropriate for providing one or more of the features described herein.

Phones 160, 161 could be any type of phone appropriate for providing one or more of the features described herein.

The processes operating on system 120 are described in further detail below.

Customer Profile Interface Process

In some embodiments, the Customer Profile Interface process provides methods and techniques to enable customers to access and interact with the Customer Profile interface process by way of various means, including, but not limited to, web-based browser applications, custom software applications designed for mobile telephone or tablet computer use, specifically formatted electronic mail or SMS messages, and interactive voice response telephony systems.

In some embodiments, the Customer Profile Interface process provides means for a customer (also referred to herein as "user") to create, modify, or delete "Called Party Profiles" to be associated with the account. Any given account can contain one or multiple Called Party Profiles, each with its own specific behaviors and/or limitations applied. Each Called Party Profile is associated with a specific PIN, which may be either assigned by Customer Profile Interface process 123 or selected manually by the user, optionally subjected to minimum password strength requirements. Further, Customer Profile Interface process 123 provides methods for modifying each Called Party' Profile so that limitations and behaviors may be specified. Settings can be provided to specify maximum calling activity limits, including, but not limited to, Time of Day
Length of Call
Number of Calls per Day
Type of Calls
Daily Spend
Personal ID Number
Shared ID Number
Activity Notifications
Facility
Resident ID
Call forwarding.

Additionally, settings can be provided to allow the user to specify windows of time, such as day-of-week or hour-of-day, during which calls may or may not be received by the particular Called Party Profile. Further, the Customer Profile Interface process 123 provides methods for allowing the user to specify the scope of the calling activity for which a particular Called Party Profile is valid. A first scope specification can be used to limit calling activity to include or exclude calls from a particular residential facility, calls from a particular resident, or calls from any resident or facility. In addition, a second scope specification can be used to designate the types of calls for which the Called Party Profile is valid. Types of calls may include, but not be limited to, collect calls, debit calls, prepaid calls, or free calls.

In an exemplary embodiment, the user can access client device 110 to interact with Customer Profile Interface process 123 to setup customer-administered controls. The user can create a Called Party Profile to define the customer-administered controls associated with the profile. Customer-administered controls can be applied to all calling types, i.e. Debit, Calling Card, Prepaid Account, Collect Calls, and Free Calls, etc. Additionally, the user can create additional profiles for household members, e.g. a profile can be setup for a spouse that allows for no restrictions, a profile can be setup for a child that restricts to time of day only, etc. If/when multiple profiles are active, the user can associate Personal ID Numbers (PIN) with each profile. Preferably PINs are not be duplicated within a household.

In an exemplary embodiment, when a user accesses the Customer Profile Interface process 123 via a web browser 113 in client device 110 and selects the customer-administered controls options, Customer Profile Interface process 123 can present the user with a screen similar to the screenshot illustrated in FIG. 4.

From this screen the user can have the option of creating, editing, or deleting profiles and/or call forward numbers. The user can also enable or disable profiles/call forward numbers by selecting the appropriate check boxes.

When adding or editing a profile the user can be presented with a screen similar to the screenshot in FIG. 5.

From this screen the user can define each profile associated with the account. The only required feature would be PINs if multiple profiles exist. If the user wishes to implement only one profile, then PINs would not be required. The following paragraphs describe exemplary fields that might be presented to the user in an exemplary embodiment.

Time Calls are Allowed—Allows the user to set the time of day that a resident is allowed to call the specific number associated with the profile (sometimes referred to herein as the "primary telephone number" or "PTN"). If only one profile exists and the resident attempts to call the PTN outside of the allowed time, Call Control process 124 causes the restriction to be implemented and the resident is immediately told he or she is only allowed to call the PTN between specified hours. If multiple profiles exist, the call is connected to the PTN, and once the answering party enters his or her PIN Call Control process 124 checks the times that calls are allowed for the entered PIN. If the call is outside of allowed calling times both the resident and party answering the phone can be so informed. If Time Calls are Allowed is enabled both a start and end time are required. A drop down menu for hours can be provided for 1-12, and a drop down menu for minutes can provide for 5 minute increments. If this option is disabled there would be no restriction on the time of day when calls may be accepted.

Length of Call—Allows the user to set how long a called party associated with the profile is allowed to speak to a resident. Preferably, this setting does not override or affect any facility restriction on maximum call-length but allows the user to set a reduced amount of time that a called party is allowed to speak with a resident. The drop down menu for setting the number of minutes can be in 1 minute increments, up to 20 minutes. For example, if a facility only allows a 10 minute call but the user sets a restriction of 15 minutes, the call will only last 10 minutes. However if a different facility allows for 20 minute calls, then a call from that facility but subject to the user's profile limit of 15 minutes would only last 15 minutes. The call would be billed at the appropriate rate, i.e. if calls are a flat rate they can be billed the full amount regardless of length. If calls are billed per minute they will billed for minutes talked. If this option is disabled there would be no restriction on the length of call the profile may receive other than the facility maximum.

Daily Spend—Allows the user to set a restriction on monetary charges for calls the profile is able to accept on a daily basis. Preferably this setting would only apply to calls that the user is responsible for paying, e.g. Collect and Pre Paid Collect. Free calls, debit calls, and calling card calls would ignore this setting. If calls are billed on a per minute basis, the last call accepted that triggers the daily spend limit can be restricted to the number of minutes left until the daily spend reaches 0. If the calls are billed at a flat rate and a call would cause the profile to exceed its allowed daily spend, the call can be denied. If this option is disabled there would be no restriction on the daily spend for a profile.

Number of Calls per Day—Allows the user to set how many calls can be accepted by a profile on a daily basis. If this option is disabled there would be no restriction on the Number of Calls per Day the profile may accept.

Type of Calls—Allows the user to set what type of calls a profile can accept. Preferably, valid options would be Collect, Debit, Calling Card, and Free. If this option is disabled the profile would not be restricted on the type of calls it may accept.

Personal ID Number—Allows the user to assign to a profile a PIN that would be entered by the answering party at the time of call and verified against restrictions. This field can be required if the user creates more than one profile. Preferably, the PIN can be configured to be a 4 digit number and cannot be duplicated within a household.

Facility Name—Allows the user to set what facilities a profile may be able to receive calls from. If blank it is assumed that calls from any accessible facilities are acceptable. If only one profile exists and a resident tries to dial the PTN from a facility that is not allowed, the resident can receive a message that the PTN does not accept calls from the facility. If multiple profiles exist, the called party can enter a PIN at which time Call Control process 124 would verify that the facility is able to call the profile. If the facility is not permitted to call the profile both the resident and called party can be told that the profile cannot accept calls from this facility. The facility name field can contain a drop down box listing all accessible facilities.

Resident ID—Allows the user to set what Residents are allowed to call a profile. If blank it is assumed that the profile may receive calls from any resident. If an entry exists then only explicitly designated residents are allowed to call the profile. If only one profile exists and a resident who is not authorized calls the PTN, the resident can receive a message telling him or her that he or she is unable to call the PTN. If multiple profiles exist, the called party can be required to enter a PIN at which time Call Control process 124 can verify the resident is able to speak with the profile. If the resident is not permitted to call the profile, both the resident and called party can be so informed.

In some embodiments, the Customer Profile Interface process 123 provides methods for enabling the user to optionally choose a pre-shared code associated with each particular Called Party Profile. This pre-shared code is distinct from the non-shared PIN associated with the particular Called Party Profile and is to be known by the resident initiating the call from the residential facility and is used to indicate to which particular Called Party Profile he or she wishes to initiate a call. Thus, as described in the next paragraph Customer Profile Interface process 123 can include a "Shared ID Number" option.

Shared ID Number—Allows the user to create a shared PIN which will then be shared with the resident to identify the intended caller. Preferably, the shared ID number may not be duplicated within a household. If this option is disabled the resident will not have the ability to direct the call to a specific profile.

In some embodiments, the Customer Profile Interface process 123 provides methods and techniques for enabling users to add, modify, or remove alternate or secondary contact addresses for each particular Called Party Profile. These secondary contact addresses may occur in multiple forms, including, but not limited to, standard PSTN telephone numbers, electronic mail addresses, VOIP endpoint addresses and/or VOIP service user IDs, such as those employed by Skype and other well-known services. Further, the Customer Profile interface process 123 enables the user to indicate a preference for each secondary contact address, indicating whether or not charges shall be billed to the primary account number for any calling activity which is eventually completed via connection to the particular secondary contact address.

In some embodiments, the Customer Profile Interface process provides methods enabling the user to indicate a preference of whether or not they would like to be notified whenever calling activity associated with the particular Called Party Profile occurs. In the instance where the user does indicate a preference to receive notifications, options can be presented allowing them to select their preferred mode of communication and corresponding address. The preferred mode of communication may include, but not be limited to, notification by electronic mail, SMS, or automated telephone (IVR) system. Thus, as described in the next paragraph Customer Profile Interface process 123 can include an "Activity Notifications" option.

Activity Notifications—Allows the user to receive messages anytime a resident call is accepted at their household. When this option is active, Notification process 126 causes a notification to be sent, preferably either by SMS or Email, to an account defined by the user. Preferably the notification can contain the date/time of call, the PIN accepting the call if required, and the length of the call.

Implementing such functionality of alternative embodiments may involve modifying one or more of the features of the exemplary embodiments disclosed herein.

Call Control Process

Some embodiments further provide a Call Control process 124. Call Control process 124 responds to a request from a resident to place a call and performs the functions of gathering information relative to Called Party Profiles associated with the requested destination telephone number and, optionally, prompting the resident to input the pre-shared code for a particular Called Party Profile. Further, Call Control process 124 causes the specified call limitations to be imposed as indicated in the applicable Called Party Profile(s), by preventing or limiting the call as appropriate, as well as performing other actions as specified in the applicable Called Party Profile(s), including, but not limited to, attempting to complete the call via the specified secondary contact addresses, authenticating the called party via the specific PIN associated with the Called Party Profile, appropriately applying call charges for secondary contact addresses, and initiating any specified notifications via a request to the Notification system.

When a resident places a call, Call Control process 124 accesses the Called Party Profiles associated with the called number to ascertain which controls are in place for the called number. If only one profile is active, Call Control process 124 respects the profile, and the call is placed accordingly— e.g. if there is only one active profile that contains a time of day restriction of 5 pm-8:30 pm and the resident attempts to call at 4:45 pm, the resident will be told that he or she is only able to call the PTN between the hours of 5 pm-8:30 pm. If/when multiple profiles exist the call can be connected to the PTN and the called party's PIN can be requested. Once the PIN has been entered Call Control process 124 examines the controls that are in place for the specific PIN and cause the restrictions in the specific profile to be enforced, e.g. if the PIN entered belongs to someone with time of day restrictions and the call is outside of those restrictions the resident and called party can both be informed. If the PIN entered belongs to someone with no restrictions the call proceeds as normal. If shared PINs are used and the resident has directed a call to a specific profile, Call Control process 124 examines the profile restrictions and causes them to be implemented prior to the call being connected to the PTN.

Figure 2:
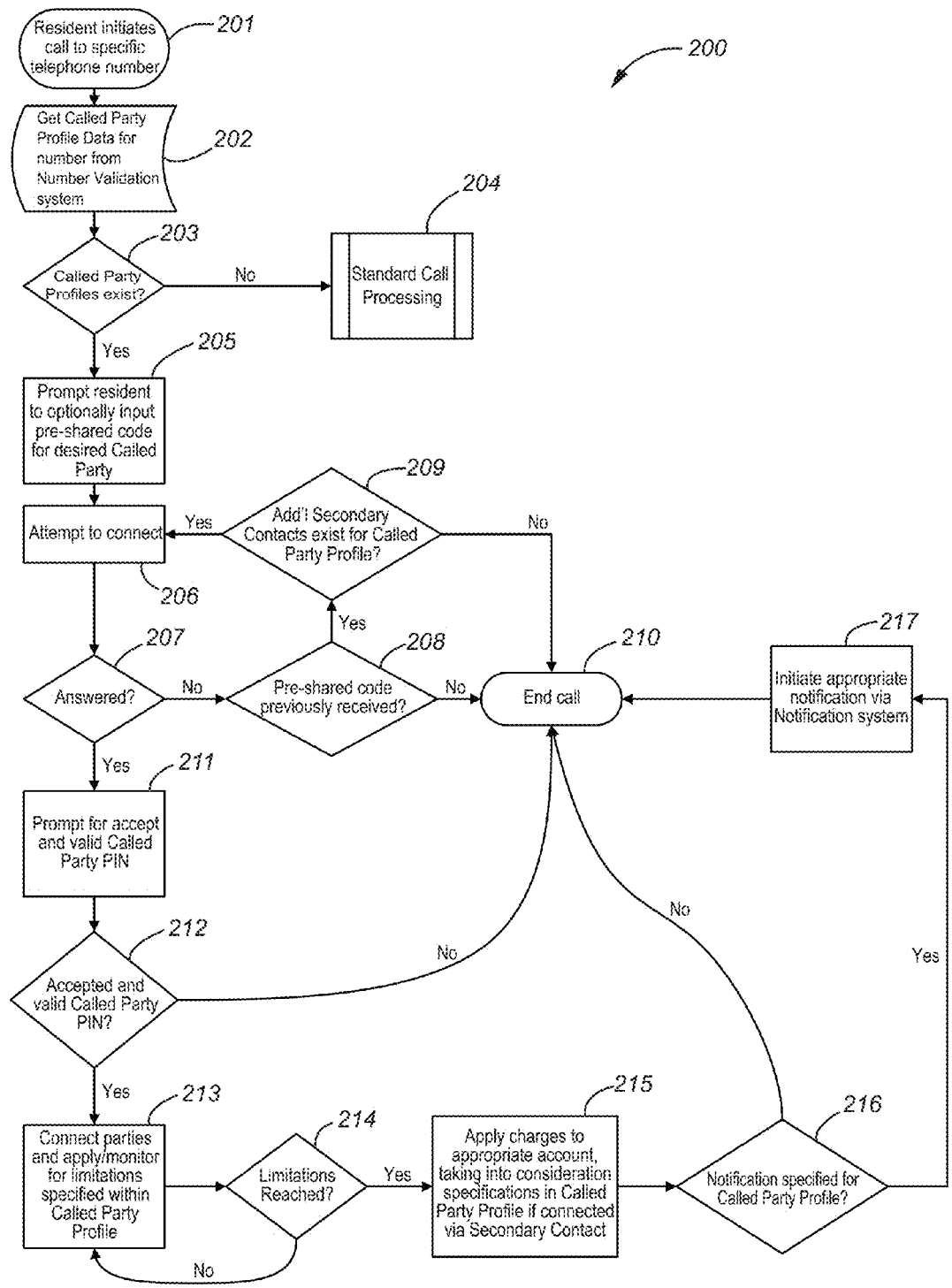
FIG. 2 is a flowchart illustrating functions according to certain embodiments.
Figure 3A:
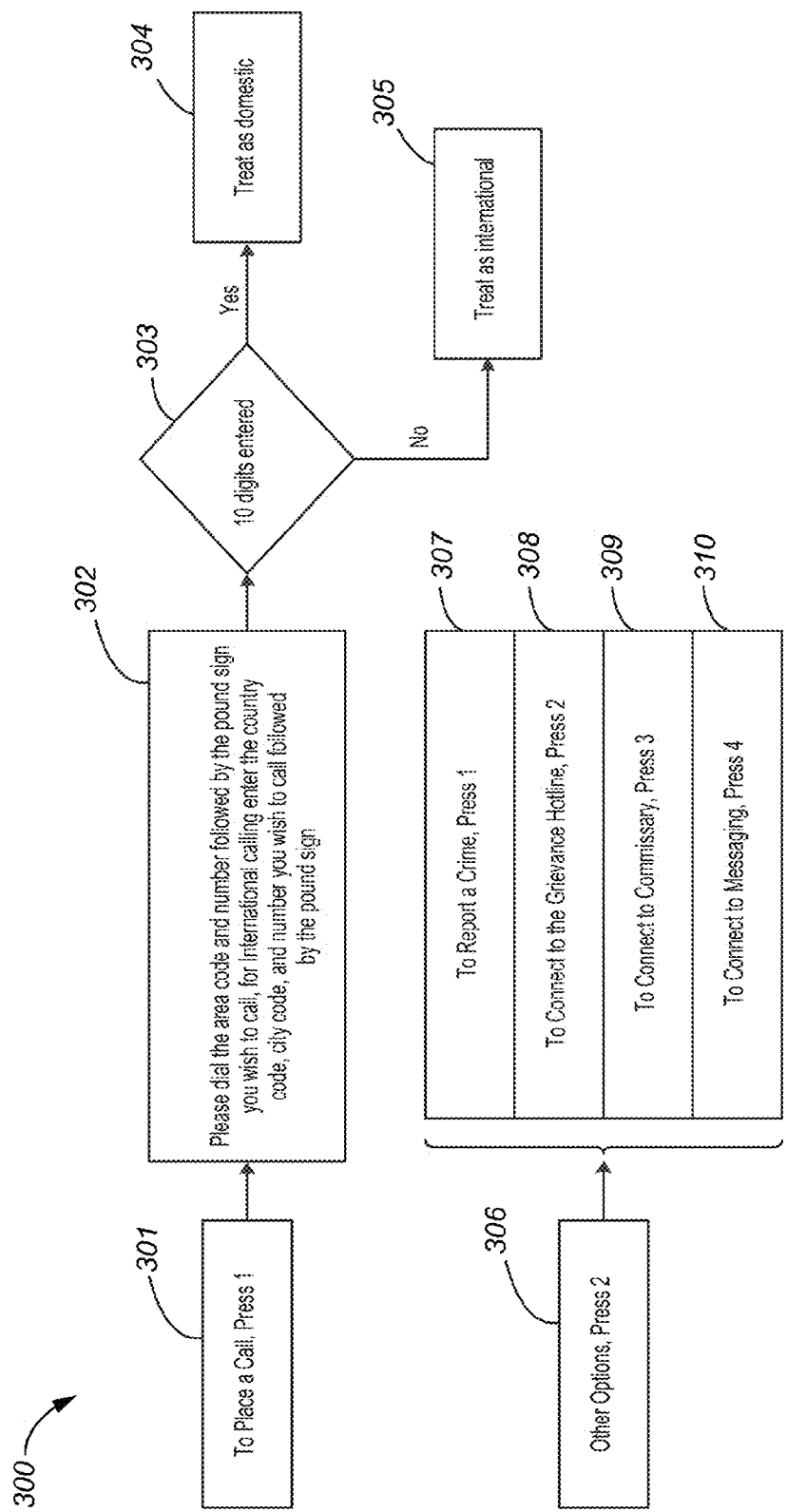
FIG. 3 is a flowchart illustrating functions according to certain embodiments.
Figure 3B:
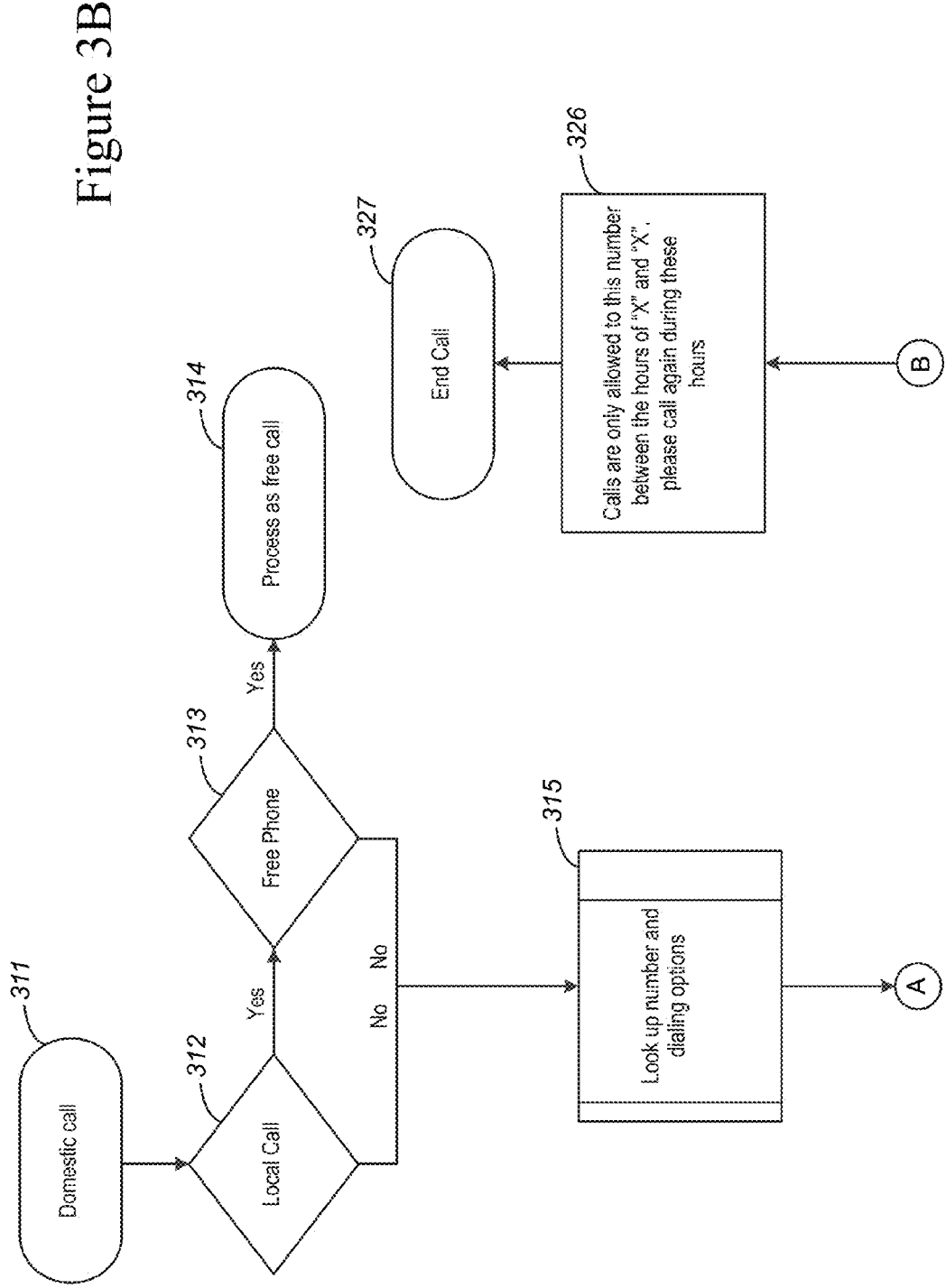
Figure 3C:
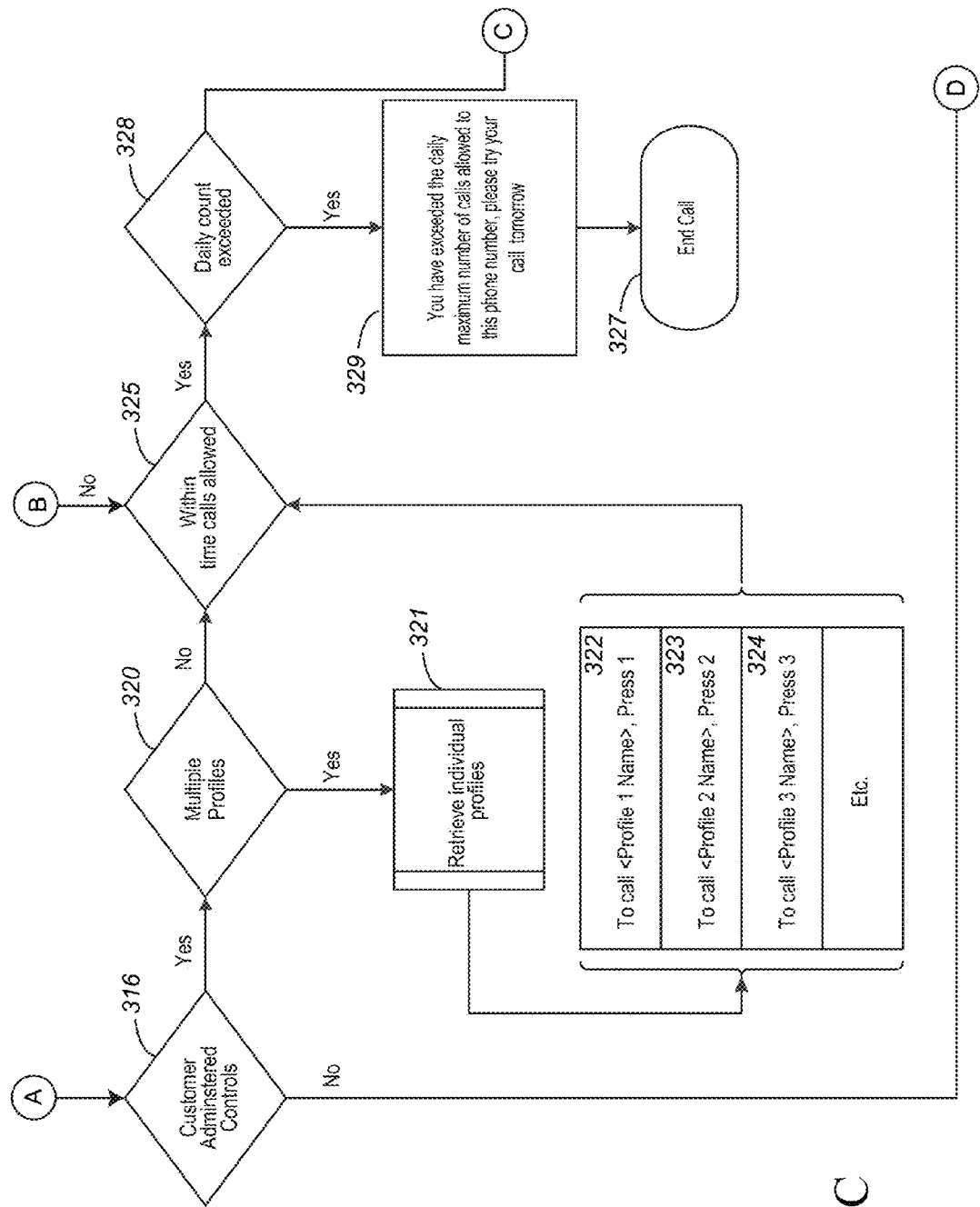
Figure 3D:
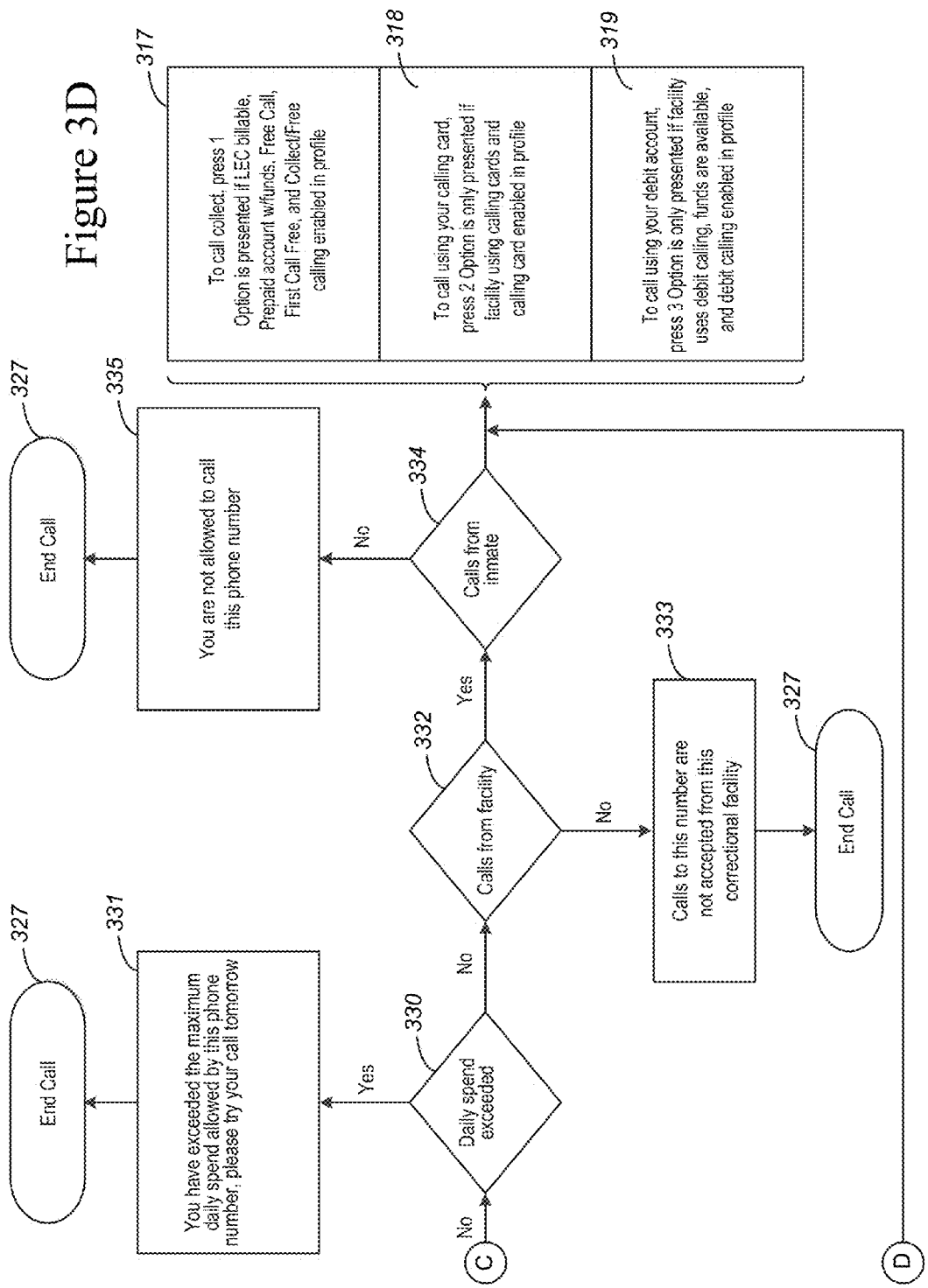

FIG. 2 illustrates a call flow process according to certain embodiments. Process 200 starts at box 201 when the resident initiates a call to a specific telephone number. At box 202, the process queries the Called Number Validation process 125 for any Called Party Profiles. At decision box 203, if Called Party Profiles do not exist then the process branches to box 204 and standard call processing is implemented. If at decision box 203 one or more Called Party Profiles do exist, then at box 205 the process prompts the resident to enter a shared PIN to direct the call to a particular called party and then attempts to connect the call at box 206. If at decision box 207 the call is not answered, then the process branches to decision box 207 where it is determined whether there is a Called Party Profile with the entered shared PIN. If there is a Called Party Profile with the entered shared PIN, then the process branches to decision box 209 to ascertain whether there additional contact numbers associated with the Called Party Profile to which the call should be forwarded. If at decision box 209 the answer is no, then the process branches to box 210 and the call ends. If at decision box 209 the answer is yes, the process branches back to box 206 and proceeds. If at decision box 208 it is determined that there is no Called Party Profile associated with the entered shared PIN, the process branches to box 210 and the call ends.

If at decision box 207 the call is answered, then at box 211 the process prompts the answering party to enter a valid PIN. At decision box 211, if a valid PIN is not entered, then the process branches to box 210 and the call ends. If at decision box 212 the entered PIN is determined to be valid then at box 213 the call proceeds and any limitations associated with the Called Party Profile are imposed. If at decision box 214 the associated limitations are not reached, the call continues at box 213 until they are reached. Once the associated limitations are reached, the process branches to box 215 where appropriate charges are applied to the account. At decision box 216, if no notifications are specified for the Called Party Profile, the process branches to box 210 and the call ends.

Otherwise if at decision box 216 there are associated notifications, these notifications are initiated at box 217 via Notification system 126 and the process then branches to box 210 where the call ends.

In an exemplary scenario, when a resident goes off hook to place a call he or she will enter the PTN, which Call Control process 124 then checks against the customer-administered controls as defined in Called Party Profiles associated with the PIN. If shared PINs are used Call Control process 124 can ask the resident for the shared PIN of the person the resident wishes to contact. If the resident chooses not to enter a shared PIN then Call Control process 124 treats the call as if it is for anyone at the PIN. When the called party answers he or she would hear a standard message, for example "This is a call from <Resident Name> a resident at the <Facility Name> . . . " Von the other hand the resident enters a shared PIN, then before acceptance options are provided the resident would further receive the following exemplary message "The resident is calling for <Profile Name>." The system would then ask for the shared PIN to be entered. If the entered PIN does not match up with the shared PIN, the called party would be told they are not the intended recipient and to either enter the correct PIN or hang up. If Call Control process 124 does not receive the correct PIN, the resident can be told that the intended recipient is not available and to try the call again later.

In some embodiments, the user can also set up call forwarding in the event the call to the PTN is not answered. Preferably Call Control process 124 applies call forwarding at the account level for all profiles rather than at a profile level. In an exemplary embodiment, the user enters a telephone number, such as for example a cell phone number, as a forwarding number into the appropriate Called Party Profile(s). When the resident dials the primary PTN, if the PTN is answered the call proceeds as normal. However, if the PTN is not answered Call Control process 124 then attempts to call the cell phone number stored in the Called Party Profile. In the event a call is forwarded successfully, the call detail record ("CDR") is marked as such, where preferably the CDR contains the original dialed number by the resident and the number where the call was answered. Once the call is answered it proceeds as normal, including the processing of any customer-administered controls. Customer-administered controls and call forwarding are preferably exclusive of each other and need not be designed to require both features to function and may function independently.

In some embodiments, the user can also have the ability to set up call forwarding for each profile. In this embodiment, a child account would not be able to self-fund, and all funds would be applied at the parent level. If a child account wanted to become self-funded it would be moved out from under the primary account and would become its own primary account. Additionally the child account could have a completely different set of phone numbers to call from the primary account.

In some embodiments, if call forwarding is enabled at the profile level, the phone numbers for each profile to which calls can be forwarded can be completely different from the call forwarding numbers associated with the primary account. In an exemplary scenario, when the first number is dialed if the call is not answered or accepted then Call Control process 124 can cause the second number to be dialed (and so-forth). Similarly, if the call is answered but not accepted Call Control process 124 can attempt to call the second number. This approach compensates for the event of answering machines, modems, faxes, etc automatically answering the phone. Furthermore, the called party can be given the option to terminate the call forwarding option each time the phone is answered. This mechanism allows a party to refuse a call without the system automatically trying to call additional phone numbers. Otherwise if the called party were to simply hang up without terminating the call forward option, the system would interpret the hang up as non-acceptance and would try the next number.

In some embodiments, Call Control process 124 can utilize a dynamic menu in lieu of a standard menu to offer the resident only the options that are available to that particular resident or that are associated with the particular dialed number. Consider the following exemplary call flow described in FIG. 3 according to certain embodiments. The process 300 starts at a main menu with only two available options—1) place a call 301 and 2) other options 302. Upon the resident selecting to place a call, Call Control process 124 then instructs the caller to enter the phone number at box 302. If 10 digits are entered, Call Control process 124 treats the call as a domestic call as shown in boxes 303 and 304. Otherwise if more than 10 digits are entered the call is treated as an international call as shown in boxes 303 and 305. If the resident selects other options as in box 306, then exemplary options are as shown in boxes 307 through 310. If the resident is placing a domestic call as shown starting at box 311, then only calling options that are available to the resident are presented to the resident caller in this exemplary scenario. For example, as shown in boxes 313 and 314 if the call is a local call and has been dialed from a "Free Phone" the call can be processed without any further interaction from the resident. In approaches that utilize standard menus instead of the dynamic menus of this exemplary scenario, the resident may need to select Free Local Call as an option from a main menu. If in this exemplary scenario the call is not a local call or is not free, Call Control process 124 then at box 315 dynamically determines what options are available to the resident based on the phone number. For example if customer-administered controls have not been set up, the phone number is a prepaid account with no available funds, and the facility uses debit calling with funds available to the resident, then the only option the resident will receive is to call using debit funds as shown in boxes 316 and 319. If in another example customer-administered controls are enabled with multiple profiles, Call Control process 124 can present the resident with the names associated the profiles and give the resident the option to select one of the profiles to which he wishes to connect as shown in boxes 320 through 324. As an example, the resident may select to call profile 2, which has time of day restrictions and only accepts debit calls. Call Control process 124 then implements the associated limitations as appropriate, as shown in exemplary fashion at boxes 325 through 335. For example, if the resident is calling during the correct time, the prepaid account has funds, and the resident's debit account has funds, then the only option Call Control process 124 would present to the resident would be to place the call using the debit account, even though prepaid funds are available, since the profile only allows for debit calls, in this exemplary scenario the resident does not need to know a pre-shared PIN in order to select an individual to call as the system automatically gives him all available options. In the event the resident is not allowed to call a certain profile, then that profile can be omitted from the list of profiles that Call Control process 124 presents to the resident.

Implementing such functionality of alternative embodiments may involve modifying one or more of the features of the exemplary embodiments disclosed herein.

Called Number Validation Process

Some embodiments further provide a Called Number Validation process. Called Number Validation process 125 verifies whether or not the TSP can bill the call to the Local Exchange Carrier and, if the the call cannot be billed to the LEC, whether the primary account has a prepaid account with have funds. Business rules for the Called Number Validation Process 125 may involve account blocks, balance, OCN, Val code, in-service date, BNA available, BNA name, and/or BNA address, or any other appropriate checks. A balance check, for example, may involve checking whether there is a balance greater than the average cost of the calls left before reaching the credit limit. The Called Number Validation process 125 may determine whether the dialed number is on any facility block list, TSP harassment list, or similar such list. If the PTN is on any such list the call is immediately denied.

Implementing such functionality of alternative embodiments may involve modifying one or more of the features of the exemplary embodiments disclosed herein.

Notification Process in some embodiments there is further provided a Notification process. Notification process 126 receives information from Call Control process 124 specifying the address, content, and type of notification desired and is responsible for ensuring delivery of the notification to the customer, utilizing a variety of delivery methods.

Implementing such functionality of alternative embodiments may involve modifying one or more of the features of the exemplary embodiments disclosed herein.

Reporting Process

In some embodiments there are provided methods and techniques for incorporating a Reporting process into the institutional telephone system. Reporting process 127 provides reports to provide facility personnel with lists of calls that were terminated on a secondary PTN as opposed to the primary number, calls that were terminated because the resident tried to call outside of allowed times or otherwise in violation of the customer-administered call controls, lists of PTNs for which calls are refused by the answerer, and other similar reports to characterize the resident's calling activities under customer-administered controls.

Implementing such functionality of alternative embodiments may involve modifying one or more of the features of the exemplary embodiments disclosed herein.

General

The foregoing descriptions of embodiments are to be understood as being in every respect illustrative and exemplary, but not restrictive, and the scope of the subject matter disclosed herein is not to be determined only from the detailed description of illustrative embodiments but according to the full breadth permitted by the patent laws. It is to be understood that the embodiments shown and described herein are only illustrative of the principles of the present subject matter and that various modifications may be implemented by those skilled in the art without departing from the scope and spirit of the invention.

We claim:

1. A method comprising:
an institutional communication system providing a customer account interface to a customer outside of an institution, wherein the customer provides funds for a customer account to pay for calls made by a resident of the institution to multiple parties associated with the customer account, the multiple parties outside of the institution, the multiple parties receiving calls at one or more telephone numbers;

the customer account interface receiving customer input creating called party profiles for each of the multiple parties for the customer account, wherein each of the called party profiles is associated with a respective personal identification number (PIN) used to identify which of the multiple parties accepts a respective call from the resident;

the customer account interface receiving customer input specifying party-specific limitations applied to each of the called party profiles to limit how the funds may be used by each of the multiple parties for calls from the resident, the limitations providing call length limits or spending limits for calls from the resident for the called party profiles; and the institutional communication system controlling calls from the resident to the multiple parties according to the limitations.

2. The method of claim 1, wherein the limitations provide party-specific call length limits for calls from the resident of the institution for the called party profiles.

3. The method of claim 1, wherein the limitations provide party-specific spending limits for calls from the resident of the institution for the called party profiles.

4. The method of claim 3, wherein the limitations provide party-specific daily spending limits for calls from the resident of the institution for the called party profiles.

5. The method of claim 1, wherein the limitations provide party-specific limits on how many calls from the resident may be completed in a specified period of time for the called party profiles.

6. The method of claim 1, further comprising the institutional communication system notifying the customer of acceptance of a call from the resident by a particular party of the multiple parties.

7. A method comprising:

an institutional communication system providing a customer account interface, wherein the customer provides funds for a customer account to pay for calls made by a resident of the institution to the customer, the customer outside of the institution and receiving calls from the resident at a first telephone number;

the customer account interface receiving customer input for the customer account specifying a second telephone number to use to forward unanswered calls from the resident to the first telephone number;

the institutional communication system receiving a call from the resident to the first telephone number;

the institutional communication system determining that the call to the first telephone number has not been answered by the customer;

based on determining that the call to the first telephone number has not been answered by the customer, the institutional communication system forwarding the call to the second telephone number; and the institutional communication system tracking that the call was actually received at the second telephone number.

* * * * *